United States Patent [19]
Osenbaugh et al.

[11] 3,905,089
[45] Sept. 16, 1975

[54] METHOD OF CONSTRUCTING A ONE-PIECE ALUMINUM DIFFERENTIAL HOUSING

[75] Inventors: Carl D. Osenbaugh, Fort Wayne; Ronald E. Bollet, Auburn, both of Ind.

[73] Assignee: Dana Corporation, Toledo, Ohio

[22] Filed: Feb. 22, 1974

[21] Appl. No.: 445,009

[52] U.S. Cl. .................. 29/434; 29/527.6; 74/607; 74/713; 180/88; 301/124 H
[51] Int. Cl.² .................. F16H 57/02; B60B 35/16
[58] Field of Search .................. 74/607, 710, 713; 301/124 H; 29/527.6, 434, 196.2; 164/111; 180/88

[56] References Cited
UNITED STATES PATENTS

| | | | |
|---|---|---|---|
| 1,446,502 | 2/1973 | Harper | 74/607 |
| 2,701,972 | 2/1955 | Hoffman | 74/607 |
| 3,069,209 | 12/1962 | Bauer | 164/116 X |

*Primary Examiner*—Samuel Scott
*Assistant Examiner*—John Reep

[57] ABSTRACT

An axle including a unitized carrier housing and a method of constructing the same are provided. The carrier housing comprises an one-piece casting with a cover plate. Sleeves are cast integrally with the housing and provide a means of attachment and alignment for the tubes within which are carried the axle shafts. Preferably the sleeves are knurled or otherwise provided with an irregular surface to provide a secure attachment to the housing. The sleeves also provide access to the interior of the differential housing for machining the bearing seats within the housing. This construction and method of assembly is most advantageous in providing unitized carrier housings of cast aluminum and like materials which are not readily amenable to being welded, subsequent to machining, to the axle tubes.

2 Claims, 2 Drawing Figures

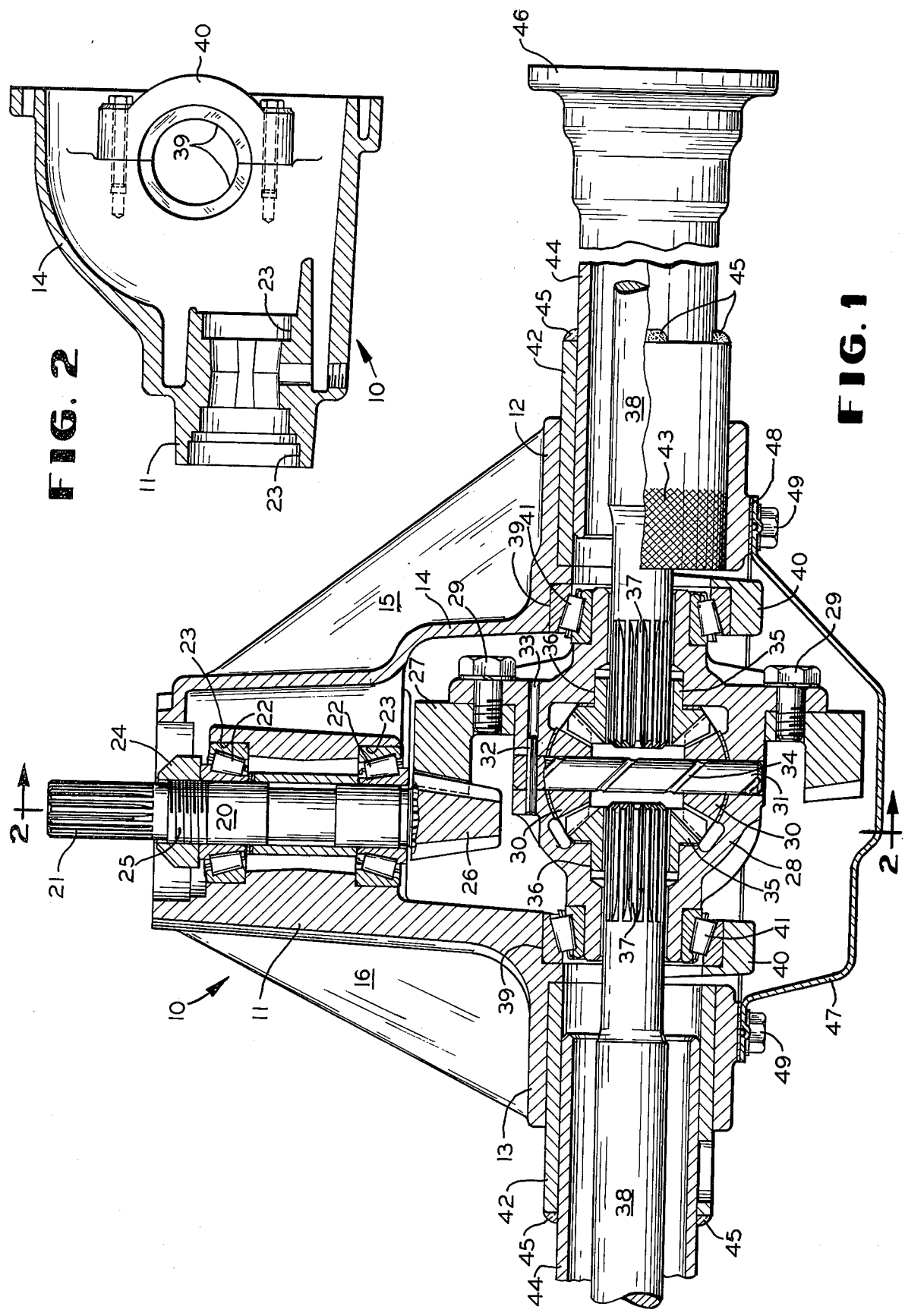

METHOD OF CONSTRUCTING A ONE-PIECE ALUMINUM DIFFERENTIAL HOUSING

BACKGROUND OF THE INVENTION

Differential housings are generally made of a malleable iron casting and include a two-piece bolted construction seat for the bearings which support the differential gear case. In assembling a unitized carrier type axle containing a differential, the differential bearing seats are machined through the adjacent openings for the axle tubes. Following this machining operation the gears, bearings and differential case are assembled with the housing and the tubes are press fit and welded in place. The axle shafts and other portions of the axle are then assembled.

This method of forming an axle is generally satisfactory when working with malleable iron differential housings. It is not suitable when using other metals, particularly aluminum, which are being used increasingly to reduce the axle weight because of the difficulty in achieving a strong press fit. In addition, welding of aluminum is difficult, particularly to materials such as steel which are commonly used for axle tubes.

Consequently, aluminum carrier housings have conventionally been cast as two separate pieces, each piece including one axle tube receiving trunnion. Machining of the bearing seats cannot be satisfactorily done through the tubes. The provision of a two-piece casting, however, allows access for the necessary machining subsequent to which the two differential halves are bolted together. Such a construction is not altogether satisfactory as it results in an axle which is not as strong as one using a comparable one-piece differential housing. Also, additional assembly and sealing problems are associated with the two-piece casting approach.

It is an object of the present invention to provide an axle construction with a strong one-piece carrier housing of aluminum or the like.

It is a further object to provide a method for construction and assembly of such an axle.

SUMMARY OF THE INVENTION

The above and other objects are achieved by an axle having an one-piece carrier housing of aluminum of the like with two preformed axially aligned sleeves cast therein and mating tube concentrically mounted with and axially overlapping said sleeve and secured thereto. A differential gear case with its associated gears is mounted within said housing. One axle shaft extends from said case on each side thereof and through each of said sleeves and tubes.

BRIEF DESCRIPTION OF THE DRAWINGS

While the specification concludes with claims which particularly point out and distinctly claim the subject matter regarded as forming the present invention, it is believed that the same will be better understood with reference to the following description of the preferred embodiments and the accompanying drawings, in which:

FIG. 1 is a horizontal cross-sectional view, partially cut away for clarity, of a preferred axle construction of the present invention; and, FIG. 2 is a vertical cross-section of the axle of FIG. 1, with gearing and driveshafts removed for clarity, taken along line 2—2 of FIG. 1.

DESCRIPTION OF THE PREFERRED EMBODIMENTS

Turning now to the drawings, FIG. 1 is a horizontal cross-sectional view of a preferred embodiment of the present invention. The differential housing, designated generally by the numeral 10, is a single casting including an input shaft receiving portion 11, annular trunnion flanges 12 and 13 for carrying the output shafts and axle sleeves as will hereinafter more fully be described, a central differential receiving portion 14 and optionally, but preferably, strengthening webs 15 and 16.

The driving members and differential gearing are essentially conventional and include an input shaft 20 with splines 21 or other means for connection to a vehicle driveshaft or the like. The shaft 20 is supported on bearings 22 supported by bearing seats 23 which are machined in the housing 10. A nut 24 is mounted on threads 25 for securing the input shaft 20 with respect to bearings 22. Driving pinion gear 26 is affixed to and preferably integral with input shaft 20 and drivingly engages ring gear 27 which is integral with or affixed to the differential gear case 28 by any suitable means such as bolts 29.

Differential pinion gears 30 are drivingly and rotatably carried by differential case 28 by any suitable means such as shaft 31 which is held in place by a split tubular pin 32 which frictionally engages the bore 33 in the case 28. Preferably, although optionally, a spiral groove 34 is provided in shaft 31 to better distribute lubricant to the pinion gears 30. Side gears 35 are carried in the bores 36 in the case 28 and are drivingly associated with the pinion gears 30. Splines or other means (not shown) are provided on the interior of side gears 35 to drivingly engage complementary surfaces, such as splines 37 on output shafts 38.

Case 28 is rotatably mounted on bearings within the bearing seat 39 in housing 10 and bearing retainers 40 (shown most clearly in FIG. 2) on bearings 41. Seats 39 must be accurately machined in alignment with one another to achieve satisfactory differential performance, quiteness and life. As previously mentioned, conventional practice with an one-piece carrier housing involves machining the bearing seats 39 on both the housing 10 and the bearing retainers 40 through the axle tube trunnion flanges prior to inserting and securing the tubes within the housing.

To provide an axle with an one-piece differential housing of aluminum, magnesium or other metals or alloys which are not well suited to the conventional construction, a two-piece axle tube construction is used. The first piece, sleeve 42, is preformed and cast into the housing 10; i.e., the housing 10 is cast around the sleeves 42 by use of known casting techniques. Die casting is particularly well suited and preferred for use with the present invention. Preferably sleeves 42 are made of steel such as that normally used for axle tubes and have an irregular surface, such as that provided by knurling 43, on the exterior to provide the strongest attachment between the housing 10 and sleeve 42. The tubes 44 are concentric with and mate with the sleeves 42 and axially overlap and are secured to said sleeves 42. Preferably, the tubes 44 snugly fit within the sleeves 42 and are welded thereto by welds 45. The tubes 44 are of generally conventional construction including flanges 46 for mounting to the wheels and their associated parts in the known manner.

Construction and assembly of the axle is as follows. The differential housing 10 is die cast about the sleeves 42. The necessary machining, including at least the machining of the bearing seats 39 is next done. Bearing seats 39 are machined in accurate alignment with one another with access through the adjacent sleeves 42. The bearing retainers 40 are, of course, secured in place and machined along with the housing 10. Preferably the sleeves 42 extend only an inch or so beyond the annular flanges 12 and 13 thereby allowing the use of a relatively short shafted tool (which, as is well known, is more rigid and therefore allows accurate machining). Although at least some of the benefits of the present invention can be realized with the use of only one sleeve 42, through which both of the bearing seats 39 are machined, it is preferred that two sleeves 42 be used as described hereinbefore.

Following the machining, and in any convenient order, the input shaft 20 with its associated pinion gear 26 and bearings is secured in place, the bearing retainers 40 are removed to allow insertion of the differential case 28 and its associated gearing. The differential case 28 and its associated gearing and bearings 41 are put in place and the bearing retainers 40 are reinstalled, with care being taken to maintain the retainers in the position in which they were earlier machined. At any time during, and preferably at the end of, this sequence the tubes 44 are put in place.

Next, the axles 38 are inserted into the differential. Preferably this is done before the cover 47 and its gasket 48 are put in place and secured to the housing 10 by bolts 49.

While the foregoing has described the invention by reference to the preferred embodiment thereof it is understood that the specification is descriptive and not limiting. Many other embodiments within the spirit and scope of the following claims will occur to those skilled in the art.

What is claimed is:
1. A method of constructing an axle including a differential said method comprising:
   a. providing a pair of axially aligned sleeves;
   b. casting an one-piece differential housing of aluminum or the like about said sleeves;
   c. inserting a cutting tool through said sleeves and machining bearing seats in said housing adjacent to said sleeves;
   d. placing a tube in mating and axially overlapping relationship with each of said sleeves and securing said tubes of the associated one of said sleeves and installing differential gearing within said housing, said gearing including bearings mating with the seats machined in step c; and
   e. inserting axle shafts through said tubes and sleeves and into driving engagement with said differential gearing.

2. A method of constructing an axle including a differential said method comprising:
   a. providing a sleeve and a first tube in axial alignment
   b. casting an one-piece differential housing of aluminum or the like about said sleeve and tube;
   c. inserting a cutting tool through said sleeve and machining bearing seats in said housing adjacent to said sleeve and said tube;
   d. placing a second tube in mating and axially overlapping relationship with said sleeve and securing said tube to said sleeve and installing differential gearing within said housing, said gearing including bearings mating with the seats machined in step c; and
   e. inserting axle shafts through said tubes and sleeve and into driving engagement with said differential gearing.

* * * * *